United States Patent Office 3,523,075
Patented Aug. 4, 1970

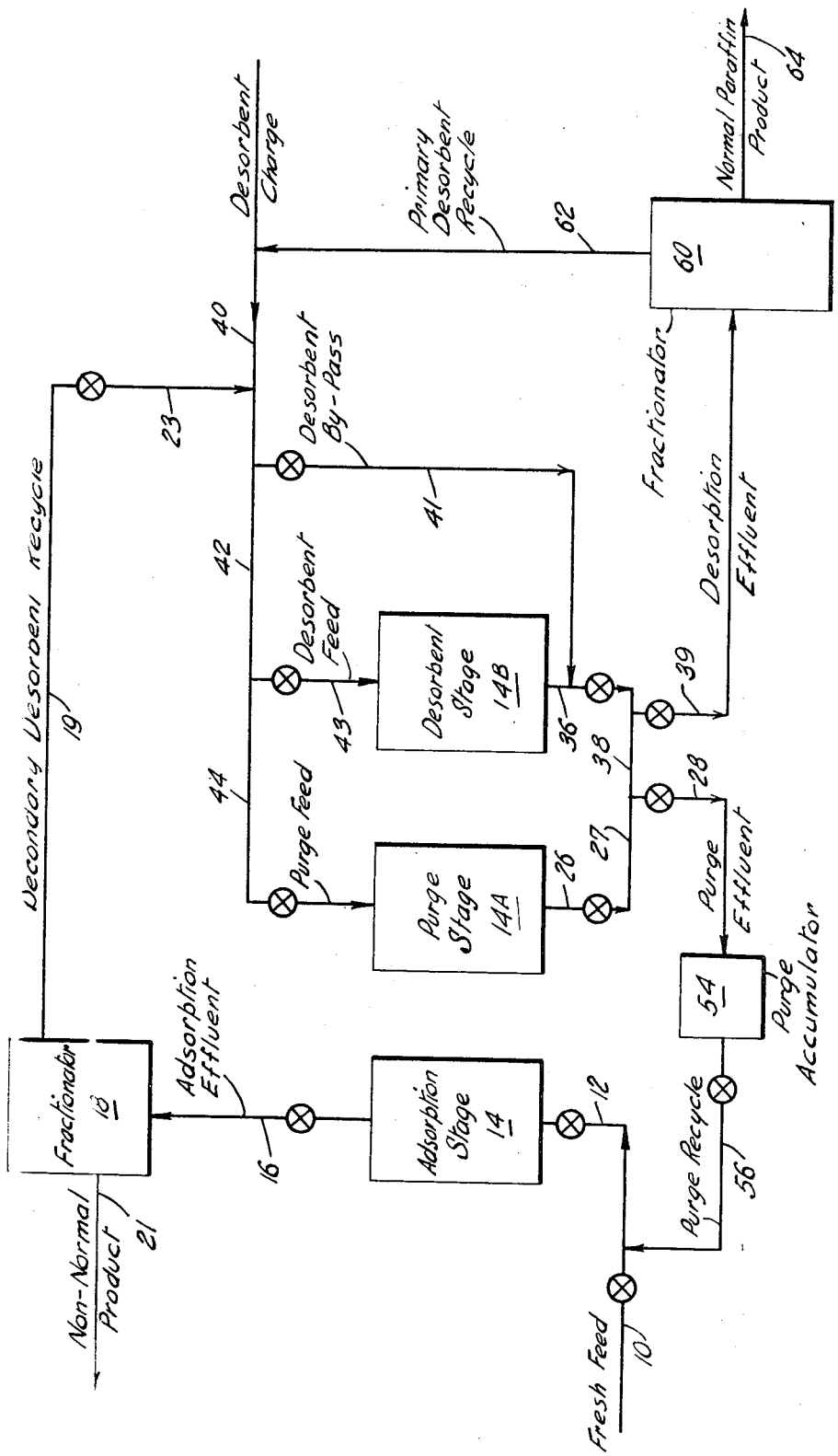

3,523,075
CONTROL OF PURGE VELOCITY AND VOLUME IN MOLECULAR SIEVE SEPARATION OF HYDROCARBONS
Richard W. Stokeld, Jr., Groves, Tex., assignor to Texaco Inc., New York, N.Y., a corporation of Delaware
Filed Mar. 11, 1968, Ser. No. 712,166
Int. Cl. C10g *25/04*
U.S. Cl. 208—310                                            7 Claims

ABSTRACT OF THE DISCLOSURE

An improved straight chain hydrocarbon separation process using a molecular sieve selective adsorbent wherein after the adsorption step, the purge medium vapor hourly space velocity is maintained between 50 and 1000 and the ratio of the purge medium rate to the purge volume is at least 40/1 to provide improved production and improved product purity.

---

The present invention relates to an improved method of separating straight chain hydrocarbons from a mixture thereof with non-straight chain hydrocarbons. More particularly, the present invention is directed to an improved vapor phase method of separating relatively long straight chain hydrocarbons from hydrocarbon mixtures at elevated temperatures and superatmospheric pressures using a molecular sieve selective adsorbent of Type 5A structure.

It is known from commonly assigned copending patent application Ser. No. 524,050, filed Feb. 1, 1966, now U.S. Pat. No. 3,373,103, issued Mar. 12, 1968, that $C_{10}$–$C_{20}$ straight chain hydrocarbons can be separated from vapor phase mixtures thereof with non-straight chain hydrocarbons by a method comprising the steps of adsorption, purge and desorption carried out at elevated temperatures.

It has now been found that this method can be considerably improved with a resultant increase in product purity and increased product yield by the method of the present invention.

The improved method of the present invention broadly comprises in combination an adsorption step, a depressurization step, a purge step, a repressurization step, and a desorption step. More specifically, the method of the present invention comprises an adsorption step wherein at an elevated temperature and superatmospheric pressure a vapor phase mixture of straight chain and non-straight chain including cyclic hydrocarbons is contacted with a molecular sieve selective adsorbent to adsorb the straight chain hydrocarbon components of the mixture therefrom in the pores of said adsorbent; the adsorption step is terminated; a depressuring step wherein the pressure of the adsorption step is reduced to a value below that employed in the adsorption step; the depressuring step is discontinued; a purge step wherein the laden adsorbent is contacted with a straight chain hydrocarbon in vapor phase to remove surface-adsorbed hydrocarbons and hydrocarbons in the void spaces of the bed therefrom at a prescribed space velocity/purge volume ratio; the purge step is discontinued; a repressuring step wherein the purge pressure is increased to a value greater than the pressure of the purge step; repressurization is terminated; a desorption step wherein the adsorbed straight chain hydrocarbons from the selective adsorbent are desorbed in the vapor phase with a straight chain hydrocarbon having a molecular weight less than the molecular weight of the lightest straight chain hydrocarbon component of the adsorbed hydrocarbons; the desorption step is terminated; and repeating said operation in sequence.

The expression "surface-adsorbed hydrocarbons" as used hereinabove includes all adsorption on the sieve other than in the sieve cages (within the zeolite crystal). The expression includes all the non-normal compounds adsorbed in the macropores of the sieve (inter-crystalline pores) as well as those adsorbed on the surface.

The method of the present invention is particularly adaptable for the production of high purity normal paraffins in excellent yields in a rapid, efficient and economical manner.

Accordingly, it is an object of the present invention to provide an improved hydrocarbon treating process. A further object is to provide an improved method of producing relatively high molecular weight straight chain hydrocarbons of a high degree of purity in commercially attractive yields from mixtures of such hydrocarbons and non-straight chain hydrocarbon. A still further object is to provide an improved cyclic hydrocarbon separation process which is conducted in a relatively short period of time.

How these and other objects of this invention are accomplished will become apparent with reference to the accompanying disclosure. In at least one embodiment of the invention at least one of the foregoing objects will be achieved.

By "straight chain" hydrocarbon is meant any aliphatic or acyclic or open chain hydrocarbon which does not possess side chain branching. Representative straight chain hydrocarbons are the normal paraffins and the normal olefins, mono- or polyolefins, including the straight chain acetylenic hydrocarbons. The "nonstraight chain" hydrocarbons comprise the aromatic and naphthenic hydrocarbons as well as the isoparaffinic, isoolefinic hydrocarbons and the like.

Straight chain hydrocarbon-containing mixtures which are suitably treated for the separation of straight chain hydrocarbons therefrom include the various petroleum fractions such as a naphtha or a gasoline fraction, a diesel oil fraction, a kerosine fraction, a gas oil fraction and the like. A typical hydrocarbon fraction which may be treated for the removal of straight chain hydrocarbons therefrom might have a boiling point or boiling range in the range 40–600° F. and higher and contain a substantial amount of straight chain hydrocarbons, e.g. 2–35% by volume and higher. More particularly, a hydrocarbon fraction to be treated and containing straight chain hydrocarbons might have an initial boiling point in the range 40–300° F. and an end point in the range of 150–600° F. and higher. A hydrocarbon fraction treated for the removal of straight chain hydrocarbons therefrom might have the following composition.

| Hydrocarbon type: | Percent by volume |
|---|---|
| Naphthenes | 0–75 |
| Aromatics | 0–50 |
| Acyclic saturates and unsaturates (including normal paraffins, isoparaffins, normal olefins and/or isoolefins) | 2–90 |

Typical refinery stocks or petroleum fractions which may be treated for the adsorptive separation of straight chain hydrocarbons therefrom are a wide boiling straight run naphtha, a heavy straight run naphtha, a light straight run naphtha, a catalytic cracked naphtha, a thermally cracked or thermally reformed naphtha, a catalytic reformed naphtha and the like, or a diesel oil or kerosene or gas oil fraction including mixtures thereof and wherein the hydrocarbon fraction or mixture may have been catalytically pretreated with hydrogen.

The practice of this invention is applicable to any solid selective adsorbent which selectively adsorbs straight chain hydrocarbons to the substantial exclusion of non-straight chain hydrocarbons. This invention, however, is particularly applicable to a molecular sieve selective adsorbent comprising certain natural or synthetic zeolites or aluminosilicates, such as a calcium aluminosilicate, which exhibits the property of a molecular sieve, that is matter made up of porous crystals wherein the pores of the crystals are of molecular dimension and are of substantially uniform size. In general, zeolites may be described as water-containing aluminosilicates having a general formula

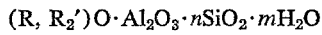

$(R, R_2')O \cdot Al_2O_3 \cdot nSiO_2 \cdot mH_2O$ wherein R may be an alkaline earth metal such as calcium, strontium or barium or even magnesium and wherein R' is an alkali metal such as sodium or potassium or lithium. Generally, these materials when dehydrated for the removal of substantially all of the water therefrom, retain their crystalline structure and are particularly suitable as selective adsorbents.

A particularly suitable solid adsorbent for straight chain hydrocarbons is a calcium aluminosilicate, apparently actually a sodium calcium aluminosilicate, marketed by Linde Co., and designated Linde Molecular Sieve Type 5A or 5A-45. The crystals of this particular calcium aluminosilicate have a pore size or opening of about 5A units, a pore size sufficiently large to admit straight chain hydrocarbons, such as the normal paraffins and the normal olefins, to the substantial exclusion of the non-straight chain hydrocarbons, i.e., naphthenic, aromatic, isoparaffinic and isoolefinic hydrocarbons. This particular selective adsorbent is available in various sizes, such as in the form of ⅛″ or 1⁄16″ diameter extrusions, or as a finely divided powder having a particle size in the range of 0.5–5.0 microns. In general, a selective adsorbent employed in the practice of this invention may be in any suitable form or shape, granular, spheroidal or microspheroidal.

The method of the present invention should be carried out in the vapor phase and under essentially isothermal conditions. The particular operating conditions selected are dependent on the nature of the feed stream to the adsorption zone, the carbon number range of the feed stream and desired product stream as well as the carbon number distribution (relative amounts of each carbon number) within the range, the straight chain hydrocarbon content of the feed stream and the olefinic, sulfur, nitrogen and aromatic content thereof. In general, the feed stream preferably should be relatively low in olefins, sulfur, nitrogen and aromatic content and these impurities can be readily reduced to acceptable limits or removed in a manner well known in the art such as by mild hydrogenation involving mild catalytic reforming. In addition, the feed stream should be relatively free from the lower molecular weight hydrocarbons such as in the range from about $C_1$–$C_6$ as such light hydrocarbons complicate recovery of the desorbing medium.

In the accompanying drawing the single figure thereof illustrates a schematic flow diagram of one method of carrying out the present invention. In the drawing, vessels 14, 14A and 14B represent the same sieve case in three different phases of the operating cycle.

In the drawing a vapor phase mixture of relatively high molecular weight straight chain and non-straight chain hydrocarbons is charged by way of lines 10 and 12 into a lower end of an adsorption vessel 14 maintained at an elevated temperature and superatmospheric pressure containing a bed of synthetic calcium sodium aluminosilicate of Type 5A structure such as a Linde 5A–45 Sieve therein. In the adsorption vessel 14 the straight chain components of the feed mixture are adsorbed by the selective adsorbent. From the outlet end of the vessel 14 through line 16 there is recovered a treated effluent mixture now containing a substantially reduced amount of straight chain hydrocarbons therein as well as desorbing medium present in the sieve cages from a previous desorption step and the effluent is passed to a fractionator 18 from which is recovered a non-straight chain hydrocarbon product stream by way of line 21 which can be passed to a storage vessel not shown for use as a fuel source and a desorbent recycle stream by way of line 19 which can be returned to desorption feed line 40 by way of line 23. The desorbent medium present in the adsorption effluent is obtained from the previous cycle wherein during desorption, a portion of the desorbing medium is adsorbed by the sieve pores from which the higher molecular weight straight chain components have been removed.

At the completion of the adsorption step, hereinafter more fully described, the feed in line 10 to adsorption vessel 14 is discontinued. In the depressuring step, the vessel 14A is depressured by venting through lines 26, 27, 28 and accumulator 54 maintained at about atmospheric pressure. When vessel 14A is at the preselected low pressure in the depressurizing step, the purge step is begun. In the purging step, a stream of desorbing medium contained in lines 40, 42 and 44 is introduced countercurrent to the flow of the feed stream 10 into vessel 14A at a prescribed space velocity/purge volume ratio and a purge effluent stream is withdrawn therefrom by way of lines 26, 27 and 28 and passed to purge accumulator 54. At the end of the purge step the repressuring step is commenced.

In the repressuring step, the flow of the stream of desorbing medium into vessel 14A by way of line 44 is continued to increase the pressure in the vessel to the selected desorbing pressure. When the selected desorbing pressure is attained in vessel 14A the desorption step is begun.

In the desorption step, the desorbing medium in the vapor state is passed through lines 40, 42 and 43 into the adsorbent vessel 14B containing the straight chain hydrocarbon components adsorbed by the selective adsorbent. The flow of the desorbing medium is also countercurrent to the feed flow during the adsorption step.

Countercurrent desorption flow (i.e., opposite to the flow in the vessel during adsorption) is highly desirable to assist in removing adsorbed straight chain hydrocarbons from the selective adsorbent.

The resulting desorption effluent is withdrawn from vessel 14B by way of line 36 and passed through lines 38 and 39 to fractionator 60 wherein the desorbate and desorbing gas are separately recovered. The adsorbed straight chain hydrocarbons in the desorbate are recovered from fractionator 60 by way of line 64. The desorbing medium is recovered by way of line 62 and can be returned to line 40 for further use.

At the termination of the desorption step, vessel 14B is depressured to attain the lower pressure used in the adsorption step and the cycle is repeated by introducing an additional quantity of fresh feed into vessel 14 by way of line 10 and line 12.

The adsorption step in the process of the present invention is carried out with the feed stream being in the vapor phase.

The particular adsorption temperature used varies with the type of charge stock, carbon number content thereof, and desired range of the straight chain hydrocarbons to be recovered from the charge stock. However, it is necessary to carry out the adsorption step at a temperature above the dew point of the vaporized feed stream to minimize surface adsorption of the non-adsorbed hydrocarbons on the selective adsorbent and also to decrease the holdup of the charge stock in the sieve voids. A further requirement, which controls the upper temperature limit of the adsorption step is the need to avoid cracking of the charge stock. Keeping in mind these lower and upper temperature limitations, it has been found that a temperature range of about 575–675° F. in the adsorption step will permit excellent separations.

In the adsorption step, the adsorption vessel should be maintained at a positive pressure above atmospheric pressure to permit the selective adsorbent to absorb an additional quantity of normal straight chain hydrocarbons in the adsorption step. It has been found that maintaining the adsorption vessel at a pressure of between 10 to 50 p.s.i.g. during the adsorption step affords good results in terms of rapid adsorption of the adsorbable components of the feed stream by the selective adsorbent.

The charge stock is introduced into the adsorption vessel at a selected rate and the feed is continued until the selective adsorbent is loaded with normal straight chain components of the feed. Introduction of feed is preferably continued beyond the saturation point of the selective adsorbent for the normal straight chain hydrocarbon components of the feed and also beyond the point at which the straight chain components of the feed begin to "breakthrough" into the adsorption effluent (non-adsorbed portion of the feed). Introduction of the feed into the adsorption vessel is preferably terminated when there is a "normal paraffin overcharge" of between about 0.5 and 15 weight percent.

"Normal paraffin overcharge" is defined as the amount of n-paraffins in the feed stock to the adsorption vessel which is charged during the adsorption step in excess of the total amount on a weight basis of recovered normal paraffins during desorption and the normal paraffins recovered in the depressuring and purge effluent streams expressed as a percentage of normal paraffins charged. The utilization of the selective adsorbent at maximum efficiency is a material factor in the process of the present invention because it compensates for the less than complete desorption of the adsorbed straight chain hydrocarbons in the subsequent desorption step. The overcharge range of 0.5–15 weight percent is suitable for excellent sieve utilization in a short processing time.

After termination of the adsorption step the adsorption vessel is depressured in a depressuring step to a lower pressure than the adsorption pressure. This depressuring step is required to remove some of the surface adsorbed non-normal straight chain hydrocarbons from the selective adsorbent and to also begin to remove from the adsorption vessel, particularly from the void spaces between the selective adsorbent some of the unadsorbed portion of the charge stock while minimizing loss of the adsorbed straight chain hydrocarbons from the sieve pores.

The depressuring step is terminated when the adsorption pressure is decreased to about atmospheric pressure, and advantageously in the range of 0–10 p.s.i.g. The depressuring step is carried out at substantially the same temperature as was used in the adsorption step.

Following termination of the depressuring step, a purge step is begun using as the purge medium a vaporized stream of the material subsequently used as the desorbing medium. The purge step is carried out at substantially the same temperature as the adsorption and depressuring steps, and at the reduced pressure attained in the depressuring step. In this purge step a stream of the vaporized desorption medium is introduced into the adsorption vessel in a direction countercurrent to the flow of the charge stock thereto. The purge medium removes the remaining portion of the charge stock from the adsorption vessel and the surface adsorbed non-straight chain components from the selective adsorbent. In the purge step it is necessary to maintain the purge medium in the vapor state for efficient operation and the flow rate thereof at a value between 50 and 1000 vapor hourly space velocity and the purge gas volume at a value between 0.1 and 10 volumes and wherein the ratio of the purge medium rate to the purge volume is at least 40/1 and up to about 7000/1, preferably between 50 and 3500/1 to minimize removal of the pore adsorbed straight chain components of the feed stream and to maximize removal of surface adsorbed and the bed-entrapped contaminating components. The term "vapor hourly space velocity" refers to the purge medium charge rate expressed as vapor volume (at purge conditions) per hour per volume of adsorbent. The term "purge volume" refers to the amount of urge medium in the purge effluent stream per cycle and is equivalent to one vapor volume displacement (at purge conditions) of the total volume occupied by the sieve bed. Most efficient operations are conducted using a purge medium velocity of 170 to 680 vapor hourly space velocity and a purge medium volume of 0.2 to 4.0 and a purge medium rate to purge volume ratio of at least 50/1 when it is desired to attain exceptionally high n-paraffin product purity. The effluent from the purge step comprising purge medium, unadsorbed charge stock and surface adsorbed components of the charge stock together with some adsorbed n-paraffins removed from the sieve pores by the purge medium is returned to the fresh feed lines as a supplemental charge to the adsorption vessel. Routing of the purge effluent in this manner permits readsorption by the sieve of the normal straight chain hydrocarbon components of the feed that had been removed therefrom in the purge step. In addition the normal paraffins in the purge stream effluent are not lost to the process.

After completion of the purge step, the vessel is repressured to the desorption pressure which is advantageously about 20–75 p.s.i.g., and preferably about 1–20 p.s.i.g. above the highest pressure in the sieve vessel during the adsorption step. This repressuring step is necessary to permit more rapid desorption of the pore adsorbed straight chain components from the adsorbent and to facilitate removal of these components from the sieve by the desorbing medium in the desorption step. The desorption pressure is attained by discontinuing the flow of the purge effluent stream to the purge accumulator via line 28, while continuing the flow of purge medium into the adsorption vessel. The rate of flow of the desorbing medium into the adsorption vessel is about 0.25–3 liquid hourly space velocity (LHSV) to remove the pore adsorbed straight chain hydrocarbons from the sieve. The desorption effluent comprising a mixture of desorbed straight chain hydrocarbons and desorbing medium is recovered from the adsorption vessel and then treated to separately recover the desorbing medium and the desorbed straight chain hydrocarbons.

In the desorbing step, the desorbing medium employed is essentially of the same composition as the purge medium. Use of the same hydrocarbon composition as the purge and desorption media avoids the problem of product contamination with other hydrocarbons while simplifying the processing requirements. Choice of a suitable desorption medium for use in the practice of the present invention is largely dependent on the composition of the fresh feed, avails thereof and desired end product carbon number distribution. In general it has been found that most advantageous results are obtained when the desorption medium has a composition comprising a major amount of straight chain hydrocarbon or a mixture of straight chain hydrocarbons having an average of about 1 to 3 carbon atoms less than the lightest straight chain hydrocarbon in the fresh feed charge to the adsorption vessel. Maintaining a carbon number spread of about 1 to 3 between the purge-desorption media and the fresh feed charge lightest component permits effective and rapid desorption times in the process of the present invention in addition to affording ease of separation of the desorbing medium from the desired product stream by fractionation. Advantageously in the treatment of $C_{10}$–$C_{15}$ charge stocks, a purge-desorption medium comprising about 80% by weight of normal heptane has been found to be satisfactory. In processing heavier stocks, e.g. $C_{14}$–$C_{20}$ containing stocks, a desorption medium composed of $C_{10}$–$C_{12}$ straight chain components has been found to give excellent results.

The present process provides a means of shortening the desorption time of prior processes by the combination of (a) using a desorbing medium in the vapor state and comprising in itself an adsorbable normal paraffin hydrocarbon and/or admixture of such normal paraffin hydrocarbons, (b) a desorption medium space velocity of 0.25 to 3 LHSV, and (3) additionally in terminating the desorption step when about 10–35% by weight of the pore adsorbed straight chain hydrocarbon components remain in the sieve pores. Such a desorbing combination will materially improve the desorption of the adsorbed straight chain components from the sieve pores. It has been found that at a desorption temperature of about 600° F. employing an n-heptane desorption medium in the desorption of n-$C_{10}$–$C_{15}$ components from the adsorbent pores at a desorption medium space velocity in the range of about 2.0 LHSV, volumes liquid desorbent/hour/volume adsorbent, the adsorbed components can be removed to the extent of 80–90% in from about 10–17 minutes; at a 0.5 LHSV in from about 23 to 42 minutes.

In the desorption step the flow of desorbing medium into the adsorption zone is countercurrent to the fresh feed charge which preferably is upflow. By operating in this manner the lighter straight chain hydrocarbon components of the charge adsorbed in the pores of the adsorbent during the adsorption step are first desorbed, and, in turn, they assist the desorbing medium in desorbing of the adsorbed heavier straight chain hydrocarbon components nearer to the desorption outlet end of the vessel. Termination of the desorption cycle short of essentialy complete removal of adsorbed straight chain hydrocarbons from the sieve pores permits the time of desorption to be materially decreased, i.e. in the order of 25–80%. Moreover, the throughput of the charge can be materially increased with the result that more charge stock can be treated per operating day and more product streams can be obtained.

At the termination of the desorption step, the adsorption vessel is depressured to the adsorption pressure and the cyclic operation is repeated.

While the above detailed description of the process of the present invention has referred to a single vessel operation for simplicity, it is within the purview of the invention to produce same on a multi-vessel basis, wherein one or more seperate vessels are used in each of the main process steps, i.e. adsorption, purge and desorption while another set of vessels are on a regeneration cycle. Periodic regeneration of the selective adsorbent is needed to restore the activity thereof after use in the process for an extended processing period. Suitable regeneration techniques known in the art such as, for example, the process disclosed in the Carter et al. U.S. Pat. 2,908,639 can be used.

The process of the present invention is essentially a timed cycle process. It has been found that in cases where a relatively long desorption time is required satisfactory results have been achieved if the adsorption step is accomplished in about one-third of the total processing time, the remaining two-thirds being taken up by the balance of the processing steps, e.g. depressure, purge, repressure, desorption and depressure. In general in processing kerosine type charge stocks to recover the straight chain hydrocarbon components thereof it has been found that the following time sequence is advantageous: adsorption—7.5 minutes; depressure—0.50 minute; purge—1.0 minute; repressure—0.50 minute; desorption—13 minutes; a total cycle time of 22.5 minutes.

Under certain circumstances wherein the feed stock properties, carbon number distribution of straight chain hydrocarbon product, desorbing medium employed, etc., result in very short desorption times, it is more advantageous to accomplish the adsorption step is about one-half of the total processing time with the remaining one-half being taken up with the depressure, purge, repressure, desorption and depressure steps. Under such circumstances the following time sequence is advantageous: adsorption—6.5 minutes; depressure—0.5 minute; purge—0.5 minute; repressure—0.5 minute; desorption—5.0 minutes; a total cycle time of 13 minutes.

In a three vessel per set system, the time for the adsorption cycle is about one-third of the total cycle time and with a two vessel per set system the adsorption cycle time is equal to one-half of the total cycle time.

In the desorption step of the present invention, it is particularly advantageous to carry out these steps in the following manner:

In the adsorption step, the valves in lines 26, 36, 41, 43 and 44 are in the closed position. At the termination of the adsorption step the valve in line 41 opens and permits the desorbing medium maintained in the lines 40 and 41 under pressure and at elevated temperature, to be bypassed around the adsorption vessel. At the same time the valve in line 26 is opened to decrease the pressure in the adsorption vessel 14A (on the purge cycle). Then the valve in line 44 is opened to permit passage of a stream of desorbing medium into vessel 14A for the purging step. At the completion of the purging step, the vessel is repressured by the flow of the stream of desorbing medium into the vessel until the desorption pressure is reached. The valves in lines 41 and 44 are then closed and the valves in lines 43 and 36 are opened substantially simultaneously with the closing of valves in lines 41 and 44. At the conclusion of the desorption step the valves in lines 43 and 36 are closed. Operating with this valve switching sequence permits the yield of high purity normal paraffins to be increased without damaging the sieve bed by pressure variations during this portion of the cycle. This embodiment further permits use of low purge volume displacements during the purge step and minimizes the loss of adsorbed normal paraffins from the sieve pores during the purge cycle.

In carying out the process of the present invention when a relatively long desorption time is required it has been found advantageous to employ a three sieve case system wherein one sieve case is on the adsorption cycle and the remaining two cases are on the desorption cycle (i.e. includes the depressure, purge, repressure and desorption steps). Operating with two cases on the desorption cycle permits a lower desorbing medium space velocity to be employed since the available desorption time is lengthened for a given total cycle time. The beneficial results obtained by operation in this manner include increased sieve utilization at a given desorption rate or lower desorption medium requirements at the same desorption rate. It is necessary to carry out desorption of the two sieve cases on the desorption cycle in parallel to prevent readsorption of the desorbed normal paraffins at the inlet of the second sieve case. Series desorption in the sieve cases is to be avoided for this reason.

Following is a description by way of example of a method of carrying out the process of the present invention.

EXAMPLE I

A hydrotreated kerosine fraction having a boiling point range of 342 to 501° F. and containing 17.2% by weight of $C_{10}$ to $C_{15}$ straight chain hydrocarbons was charged at a temperature of 600° F. and a pressure of about 16 p.s.i.g., and at a feed rate 1.1 volumes per hour per volume of adsorbent ($V_o$/hr./$V_a$) to the lower end of an adsorption vessel measuring 44 inches by 3 inches in diameter, having an internal volume of about 5.3 liters and containing about 4630 grams of $\frac{1}{16}$ inch extruded molecular sieve selective adsorbent, sold under the trade name Linde 5A–45 Molecular Sieve. There was recovered from the other end of the vessel an adsorption effluent stream comprising 76.8 weight percent $C_{10}$–$C_{15}$ non-straight chain hydrocarbons and 1.6 weight percent $C_{10}$–$C_{15}$ straight chain hydrocarbons and 21.6 weight percent desorbing medium at a rate of 6140 cc./hr. The recovered adsorption effluent was fractionated and there was separately recovered $C_{10}$–$C_{15}$ non-straight hydrocarbons in a yield of 84.4 weight percent basis fresh feed. In the adsorption vessel, the selective adsorbent adsorbed the straight chain hydrocarbon components of the feed to the extent that after about 8.5 minutes on the adsorption cycle, the adsorbent was substantially saturated with the straight chain components. The flow of feed was continued to the adsorption zone until a total time of 13.0 minutes had elapsed at which time there was a 10% overcharge of straight chain hydrocarbons therein. The feed into the adsorption vessel was then discontinued and the vessel depressured to about atmospheric pressure in 0.5 minute. After attaining the reduced purge pressure, a purge stream of the desorbing medium in the vapor state and comprising 84.3 weight percent n-heptane, the balance being branched chain and cyclic paraffins in the 204–237° F. boiling range, was passed into the adsorption vessel at a rate of 170 vapor hourly space velocity (at purge conditions) and countercurrent to the direction of charge stock fed thereto. The flow of purge medium was continued until 2.6 purge volumes had been used and the ratio of the purge rate to the purge volume was 65/1. The purge effluent comprising 19.9 weight percent surface adsorbed materials, 45.6 weight percent purge medium and 34.5 weight percent of adsorbed straight chain hydrocarbons removed from the pores of the adsorbent, was removed at a 5560 cc./hr. rate, passed through a cooler-accumulator to reduce the temperature and pressure of the effluent to a value of about 90° F. and 2.5 p.s.i.g. and then introduced into the fresh feed line for return to the adsorption vessel on the next adsorption cycle.

After a purge period of about 0.9 minute, the flow of purge effluent from the adsorption zone was discontinued. The desorbing medium, having the same composition as the purge medium described hereinabove was passed into the adsorption vessel in the same direction as the purge medium (countercurrent to the feed on the adsorption cycle) at a rate of 0.6 LHSV ($V_o$/hr./$V_a$) to repressure the vessel to the desorption pressure of about 25 p.s.i.g. The repressuring operation was completed in about 0.3 minute. The flow of desorbing medium was continued for the remainder of the 24.6 minutes desorption cycle and there was recovered a desorption effluent which on subsequent separation yielded the following fractions: $C_{10}$–$C_{15}$ straight chain hydrocarbons, 15.6 weight percent yield, basis fresh feed, 77.8 weight percent desorbing medium, basis total desorbing medium feed (including purge). The separated desorbing medium was reused in the next sequence.

The flow of desorption medium to the adsorption vessel was discontinued when about 80% of the pore adsorbed straight chain components had been removed from the sieve pores. The desorption time was 24.3 minutes. The vessel was depressured and switched to the adsorption step and the processing sequence was repeated. The yield of $C_{10}$–$C_{15}$ straight chain hydrocarbons was 90.0 weight percent, basis straight chain hydrocarbons in the fresh feed. The $C_{10}$–$C_{15}$ straight chain hydrocarbon product contained 99.6 weight percent normal straight chain hydrocarbons by weight.

EXAMPLE II

The procedure of Example I was repeated in this example except that the adsorption cycle time was 13 minutes, the purge time was 1.1 minutes and 3.2 volumes of purge medium were used. The results are summarized in Table A below.

COMPARATIVE EXAMPLE A

The procedure of Example I was repeated in this example except that the adsorption cycle time was 14.8 minutes, the purge time was 4.6 minutes and the purge medium volume was 2.6 at a vapor hourly space velocity of 34 $V_o$/hr./$V_a$. The results are summarized in Table A below.

COMPARATIVE EXAMPLE B

The procedure of Example I was repeated in this example except that the adsorption cycle time was 15.3 minutes, the purge time was 5.7 minutes, the purge volume was 3.2 and the purge vapor hourly space velocity of the 34 $V_o$/hr./$V_a$. The results are summarized in Table A below.

TABLE A

| Example No | I | A | II | B |
|---|---|---|---|---|
| Purge volume | 2.6 | 2.6 | 3.2 | 3.4 |
| Purge medium vapor hourly space velocity ($V_o$/hr./$V_a$) | 170 | 34 | 170 | 31 |
| Ratio of purge medium rate to purge volume | 65/1 | 13/1 | 53/1 | 11/5 |
| Lbs. $C_{10}$–$C_{15}$ straightchain hydrocarbons adsorbed/100 lbs. of 5A-45 sieve used | 3.45 | 3.45 | 3.45 | 3.45 |
| Weight percent $C_{10}$–$C_{15}$ straight chain components removed in purge | 13.7 | 28.4 | 17.7 | 31.8 |
| Weight percent $C_{10}$–$C_{15}$ non-straight chain components removed in purge | 96.3 | 92.8 | 97.8 | 95.5 |
| Lbs. $C_{10}$–$C_{15}$ straight chain components removed in purge (amount adsorbed × percent removed) | 0.47 | 0.98 | 0.61 | 1.1 |
| $C_{10}$–$C_{15}$ straight chain hydrocarbon product rate lbs./hr./100 lbs. sieve used | 4.60 | 3.34 | 4.34 | 3.0 |
| $C_{10}$–$C_{15}$ straight chain hydrocarbon product purity | 99.6 | 99.2 | 99.8 | 99.2 |

Inspection of the data in the above table shows that increasing the vapor hourly space velocity and the ratio of the purge rate to purge volume while maintaining the volume of the purge constant results in the removal of an increased amount of non-straight chain hydrocarbons while decreasing the amount of straight chain hydrocarbons removed. The resulting gain in efficiency of purge step (increased removal of non-straight chain hydrocarbons and decreased removal of straight chain hydrocarbons) is shown in the Table A as improved $C_{10}$–$C_{15}$ straight chain hydrocarbon production rates and product purities. Increasing the purge medium vapor hourly space velocity from 34 $V_o$/hr./$V_a$ to 170 $V_o$/hr./$V_a$ increased the $C_{10}$–$C_{15}$ straight chain hydrocarbon product rate by 37.7% when using 2.6 purge volumes and by 41.4% when using 3.2 purge volumes. The higher purge velocity (Example I and II) also result in product purities of 99.6 and 99.8%, respectively, as contrasted to purities of 99.2 and 99.5% for the lower purge velocities (Examples A and B). Although these gains in product purity appear relatively small in terms of numbers, 0.4 and 0.3 unit, respectively, one must take into account that the increases represent the difference between success and failure in competitive markets. Extremely high purity $C_{10}$–$C_{15}$ straight chain hydrocarbon feed stocks are necessary precursers for the preparation of biodegradable detergents and plasticzires.

EXAMPLES III–VI

The results in Table B below are from another series of tests carried out under the similar conditions, cycle times etc., except as indicated, using a kerosine feed stock having a boiling point range of 364–487° F. and containing 21 weight percent $C_{10}$–$C_{14}$ straight chain hydrocarbons.

TABLE B

| Example No. | III | IV | V | VI |
|---|---|---|---|---|
| Purge time, min. | 0.77 | 0.61 | 0.47 | 0.41 |
| Purge volume | 0.2 | 0.2 | 0.2 | 0.2 |
| Purge medium vapor hourly space velocity | 126 | 159 | 203 | 237 |
| Ratio of purge medium rate to purge volume | 630/1 | 795/1 | 1,015/1 | 1,185/1 |
| Lbs. $C_{10}$–$C_{14}$ straight chain hydrocarbons absorbed/100 lbs. 5A–45 sieve used | 3.29 | 3.29 | 3.29 | 3.29 |
| Weight percent $C_{10}$–$C_{14}$ straight chain components removed in purge | 4.5 | 2.5 | 0.0 | 0.0 |
| Weight percent $C_{10}$–$C_{14}$ non-straight chain components removed in purge | 94.1 | 94.8 | 95.8 | 96.7 |
| Lbs. $C_{10}$–$C_{14}$ straight chain components removed in purge (amount adsorbed × percent removed) | 0.15 | 0.08 | 0.00 | 0.00 |
| $C_{10}$–$C_{14}$ straight chain hydrocarbon product rate lb./hr./100 lbs. sieve used | 6.13 | 6.30 | 6.48 | 6.49 |
| $C_{10}$–$C_{14}$ straight chain hydrocarbon product purity | 98.4 | 98.6 | 98.9 | 99.2 |

The data in Table B above show that at a relatively low purge volume one also obtains the beneficial effects of increasing the purge space velocity and the purge medium rate to purge volume ratio. A comparison of the product purity obtained in Examples III and IV with the product purities in Examples V and VI indicate that at the preferred purge vapor hourly space velocities and higher purge medium rate to purge volume ratios of Examples V and VI, one obtains increased straight chain hydrocarbon production rates and products of improved purity.

I claim:

1. In a cyclic vapor phase hydrocarbon separation process wherein in an adsorption step a feed mixture of $C_{10}$–$C_{20}$ straight chain and non-straight chain hydrocarbons is introduced into an adsorption zone at an elevated temperature and superatmospheric pressure to effect adsorption of the straight chain hydrocarbon components by the molecular sieve selective adsorbent of Type 5A structure in said adsorption zone, from said zone as adsorption effluent is withdrawn comprising the non-straight chain hydrocarbon components of said mixture, the adsorption step is terminated when the adsorption zone has been normal paraffin overcharged in an amount between 0.5 and 15% by weight, a depressure step wherein the adsorption zone is depressured to a pressure less than the pressure in the adsorption step and then terminated, a purge step wherein a purge gas medium of a desorbing medium comprising a major amount of at least one straight chain hydrocarbon having an average of about 1 to 3 carbons less than the lightest straight chain hydrocarbon in the feed mixture introduced into the adsorption zone is passed into the depressured adsorption zone to remove surface adsorbed components of the feed mixture therefrom, the purge step is terminated, a repressure step wherein the adsorption zone is repressured to a pressure greater than the said adsorption pressure and then terminated, a desorption step wherein a desorbing medium having the same composition as the purge gas medium is introduced into the repressured adsorption zone to effect removal of the adsorbed straight chain hydrocarbon components from the selective adsorbent, a desorption effluent is withdrawn, and the straight chain hydrocarbon components of the feed mixture are recovered therefrom, the desorption step is terminated, a second depressuring step wherein the pressure in the adsorption zone is decreased to the pressure of the adsorption step, and the cycle is repeated sequentially, the improvement which comprises in the purge step maintaining the flow rate of the purge gas medium in the range of from about 50 to 1000 vapor hourly space velocity and the purge volume in the range of from about 0.1 to 10 volumes of vapor per unit bed volume, and wherein the ratio of the purge gas medium rate to the purge gas medium volume is in the range of from 40/1 up to 7000/1.

2. Process as claimed in claim 1 wherein the purge medium flow rate is in the range of from about 170 to 680 vapor hourly space velocity, the purge volume is in the range of from 0.2 to 4.0 volumes of vapor per unit bed volume, and the ratio of the purge medium rate to the purge medium volume is between 50/1 and 3500/1.

3. A process for the separation of $C_{10}$–$C_{20}$ straight chain hydrocarbons from a petroleum fraction which comprises in an adsorption step contacting said petroleum fraction in the vapor phase at an elevated temperature and pressure and with a 5A type molecular sieve selective adsorbent to adsorb the straight chain hydrocarbons, in a purge step at a lower pressure countercurrently contacting said molecular sieve with a purge medium comprising a major portion of straight chain hydrocarbons having a lower molecular weight by 1–3 carbon atoms than the lightest straight chain component of the petroleum fraction, at a purge medium rate of between 50 to 1000 vapor hourly space velocity and a purge medium volume in the range of 0.1 to 10 volumes of vapor per unit bed volume and wherein the ratio of the purge medium rate to the purge medium volume is between 40/1 and 7000/1, and in a desorption step at a higher pressure than the adsorption pressure, removing the adsorbed straight chain hydrocarbons from the molecular sieve with a gaseous desorbing medium having the same composition as the purge medium.

4. Process as claimed in claim 3 wherein the purge flow rate is between 170 and 680 vapor hourly space velocity and the purge medium volume is 0.2 to 4.0 volumes of vapor per bed volume.

5. Process as claimed in claim 4 wherein the ratio of the purge medium rate to the purge medium volume is between 50/1 and 3500/1.

6. Process as claimed in claim 1 wherein the feed mixture is a mixture of $C_{10}$–$C_{15}$ straight chain and non-straight chain hydrocarbons, the purge medium flow rate is about 170 vapor hourly space velocity, the purge volume is between 2.6 and 3.2 and the purge medium flow rate to purge volume ratio is from about 65/1 to 53/1.

7. Process as claimed in claim 1 wherein the feed mixture is a mixture of $C_{10}$–$C_{14}$ straight chain and non-straight chain hydrocarbons, the purge medium flow rate is from about 126 to about 137 vapor hourly space velocity, the purge volume is about 0.2, the purge medium flow rate to purge volume ratio is from about 630/1 to about 1185/1.

References Cited

UNITED STATES PATENTS 3,183,182  5/1965  Yeo et al. _____ 208—310
3,373,103  3/1968  Cooper et al. _____ 208—310

HERBERT LEVINE, Primary Examiner

U.S. Cl. X.R.

260—676

UNITED STATES PATENT OFFICE

CERTIFICATE OF CORRECTION

Patent No. 3,523,075          Dated August 4, 1970

Inventor(s) Richard W. Stokeld, Jr.

It is certified that error appears in the above-identified patent and that said Letters Patent are hereby corrected as shown below:

```
              "    61, change "cycle" to --cyclic--
COLUMN 8, line 69, after "rate" add --of--

COLUMN 10, in Table A, in the column of data for Example B,
              change "3.4"  to  3.2
                "    31   "    34
                "    11/5 "    11/1
                "     3.0 "     3.07
                "    99.2 "    99.5
```

SIGNED AND
SEALED

OCT 27 1970

(SEAL)
Attest:

Edward M. Fletcher, Jr.          WILLIAM E. SCHUYLER, JR.
Attesting Officer                Commissioner of Patents